United States Patent
Perullo

(10) Patent No.: US 10,922,685 B2
(45) Date of Patent: *Feb. 16, 2021

(54) MULTI-SIGNATURE VERIFICATION NETWORK

(71) Applicant: Intercontinental Exchange Holdings, Inc., Atlanta, GA (US)

(72) Inventor: Jerry Perullo, Atlanta, GA (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,127

(22) Filed: Mar. 3, 2020

(65) Prior Publication Data

US 2020/0202346 A1    Jun. 25, 2020

Related U.S. Application Data

(63) Continuation of application No. 16/561,295, filed on Sep. 5, 2019, now Pat. No. 10,621,579.
(Continued)

(51) Int. Cl.
*G06Q 20/38* (2012.01)
*H04L 9/32* (2006.01)
(Continued)

(52) U.S. Cl.
CPC ..... *G06Q 20/3825* (2013.01); *G06Q 20/4016* (2013.01); *H04L 9/0637* (2013.01);
(Continued)

(58) Field of Classification Search
CPC ........ G06Q 40/00; G06Q 30/00; G06Q 20/00; G06Q 10/00
(Continued)

(56) References Cited

U.S. PATENT DOCUMENTS 7,794,074 B2    9/2010    Vosahlo et al.
9,870,562 B2    1/2018    Davis et al.
(Continued)

FOREIGN PATENT DOCUMENTS

WO    98/37655    8/1998
WO    2018/140913 A1    8/2018

OTHER PUBLICATIONS

Bhairav Trivedi, "Blockchain: It's a solution; now what's the problem ?", Gulf News, Dubai Sep. 4, 2016.*
(Continued)

*Primary Examiner* — Frantzy Poinvil
(74) *Attorney, Agent, or Firm* — DLA Piper LLP (US)

(57) ABSTRACT

Systems and methods for authorizing a blockchain transaction. A verification network receives a transaction request for the blockchain transaction from a payer device including a first signature generated by a first private key associated with a payer. The verification network broadcasts a verification request to verification system(s) which assess pre-agreed threshold parameters. If the parameter(s) are satisfied, at least one verification system perfects the transaction by generating a second signature using a second private key, and broadcasts the transaction to the blockchain network. If the parameter(s) are not satisfied, verification offer(s) from among the verification system(s) including the second signature(s) are used to prompt the payer device to confirm the blockchain transaction by selecting at least one of the offer(s). The verification network receives selected offer(s) from the payer device and broadcasts the transaction to the blockchain network, in accordance with the selected offer(s) and the transaction request.

30 Claims, 7 Drawing Sheets

Related U.S. Application Data

(60) Provisional application No. 62/727,824, filed on Sep. 6, 2018.

(51) Int. Cl.
  *G06Q 20/40* (2012.01)
  *H04L 9/06* (2006.01)
  *G06F 3/0482* (2013.01)

(52) U.S. Cl.
  CPC .......... *H04L 9/3247* (2013.01); *G06F 3/0482* (2013.01); *H04L 2209/38* (2013.01)

(58) Field of Classification Search
  USPC .......................................................... 705/3–44
  See application file for complete search history.

(56) References Cited

U.S. PATENT DOCUMENTS

| | | | | |
|---|---|---|---|---|
| 9,922,380 | B2* | 3/2018 | Isaacson | G06Q 30/0625 |
| 9,922,381 | B2* | 3/2018 | Isaacson | G06Q 20/3223 |
| 9,948,467 | B2 | 4/2018 | King | |
| 10,121,186 | B2* | 11/2018 | Isaacson | G06Q 20/12 |
| 10,171,248 | B2 | 1/2019 | King | |
| 10,511,580 | B2 | 12/2019 | Isaacson et al. | |
| 10,726,472 | B2 | 7/2020 | Isaacson et al. | |
| 2017/0256001 | A1* | 9/2017 | Isaacson | G06Q 20/12 |
| 2017/0323294 | A1 | 11/2017 | Rohlfing et al. | |
| 2017/0345105 | A1* | 11/2017 | Isaacson | G06F 3/048 |
| 2018/0212783 | A1 | 7/2018 | King | |
| 2018/0240165 | A1 | 8/2018 | Kilpatrick | |
| 2018/0293583 | A1* | 10/2018 | Rhie | G06Q 20/4016 |
| 2019/0296915 | A1* | 9/2019 | Lancashire | G06Q 20/3825 |
| 2019/0306137 | A1* | 10/2019 | Isaacson | G06Q 30/0641 |
| 2019/0334726 | A1* | 10/2019 | Kelly | H04L 9/3239 |
| 2019/0347656 | A1* | 11/2019 | Lu | G06Q 20/38215 |
| 2020/0117730 | A1* | 4/2020 | Vaswani | G06F 16/22 |

OTHER PUBLICATIONS

"E-Payments: Use Blockchain Technology to Rout risk out of Network Transactions", Electronics for You, New Delhi, Mar. 1, 2017.*

European Search Report dated Jan. 31, 2020, of counterpart European Application No. 19195904.8.

Adiseshu Hari, "The Internet Blockchain: A Distributed, Tamper-Resistant Transaction Framework for the Internet," Nokai Bell Labs, USA, HotNets-XV, Nov. 9, 2016, Atlanta, GA, USA, ISBN 978-1-4503-4661-0/16/11, (Year: 2016).

Ben Cresitello-Dittmar, "Application of the Blockchain for Authentication and Verification of Identity," (Year: 2016).

Jiang, et al., "A Cross-Chain Solution to Integrating Multiple Blockchins for IoTData Management," School of Engineering, Xi'an Kiaotong University, Xi'an 710049, China, (Year: 2019).

* cited by examiner

MULTI-SIGNATURE VERIFICATION NETWORK

CROSS-REFERENCE TO RELATED APPLICATIONS

This application is a continuation of U.S. patent application Ser. No. 16/561,295 filed Sep. 5, 2019, now U.S. Pat. No. 10,621,579, which in turn claims the benefit of U.S. Provisional Patent Application No. 62/727,824, entitled "MULTI-SIGNATURE VERIFICATION NETWORK", filed Sep. 6, 2018, the entire disclosures of all of which are incorporated by reference herein for all purposes.

FIELD OF THE DISCLOSURE

The present disclosure generally relates to systems and methods for authorizing blockchain-based transactions of digital assets, and more specifically, to a multi-signature authorization system including a multi-signature verification network that leverages a pool of trusted verification institutions to generate at least one signature and at least one verification offer together with a payer signature, in order to authorize blockchain-based transactions.

BACKGROUND

The use of blockchain technology for transactions involving digital assets such as cryptocurrencies has become increasingly popular due to the decentralized nature of transactions, the use of a mathematically verifiable ledger, near-immediate settlement, and isolation from operational, technical, or geo-political concentration risks. Although blockchain technology presents these advantages, managing cryptographic keys is burdensome and dangerous, exposing users to the dual threats of electronic theft and accidental loss of assets. Further, with near-immediate settlement comes a lack of "claw-back" reversibility of transactions, increasing the impact of fraud. Accordingly, there is a need to provide the security, safety, and reversibility of traditional centralized payment systems without reinstating concentration risks posed by relying on any single service provider.

SUMMARY

Aspects of the present disclosure relate to systems, methods and non-transitory computer readable media for authorizing a blockchain transaction. In some examples, system may include a verification network in communication with at least a payer computing device associated with a payer, a verification pool that includes one or more independent third-party verification computing systems (e.g., verification providers or verification institutions), and a blockchain network. In some examples, the verification network includes a computing system having a processor and a memory having programming instructions stored thereon, where the programming instructions, when executed by the processor, cause the system to perform an operation for authorizing the blockchain transaction. The operation of the verification network includes receiving, from the payer computing device, a partially-signed blockchain transaction (e.g., a transaction request). The transaction may include a first signature, where the first signature may be generated by a first private key created and managed by the payer (e.g., a first private key associated with the payer). In one example, the first signature may be the only signature included in the (partially-signed) transaction. In some examples, the partially-signed transaction may be enriched by the verification network with situational details such as (without being limited to) time, value, geolocation, merchant statistics and/or any suitable information that may be useful to a verification provider in analyzing the likelihood of attempted fraud. Since, in an exemplary embodiment, the payer private key must be protected by the payer, the nature of the present disclosure significantly mitigates the impact of unauthorized access to this payer private key, thereby significantly increasing the attractiveness of existing backup solutions.

The operation of the verification network further includes broadcasting the partially-signed transaction and details relating to one or more pre-agreed threshold parameters (e.g., risk assessment details) to the one or more verification providers. The operation may further include assessing, by at least one verification provider from among the verification pool, the one or more pre-agreed threshold parameters associated with the partially-signed transaction. The assessing may be a part of a broader risk analysis procedure and the threshold parameters may comprise one or more pre-agreed risk parameters. If the pre-agreed threshold parameters are satisfied, the (at least one) verification provider may immediately perfect (e.g., "bless") the transaction request and broadcast the now-perfected blockchain transaction to the blockchain network. Perfecting the transaction request may include generating a second signature using a second private key (e.g., created and maintained by the verification provider) and optionally imposing a pre-agreed surcharge.

In the absence of pre-agreed threshold parameters, or if the pre-agreed threshold parameters are not satisfied during the assessment, the operation may further include generating, by at least one of the one or more verification providers, one or more verification offers including a respective one or more second signatures and, optionally, in some examples, one or more risk-related surcharges. Each of the one or more second signatures may be generated by a respective one of the one or more verification providers using a second private key (e.g., created and maintained by the verification provider). In some embodiments, the one or more verification providers may transmit one or more denials, rather than verification offers.

In an example operation of the present disclosure, the first verification provider to assess the risk and perfect the transaction may prevail and capture a previously-agreed fee. In the event that the risk analysis performed by the verification provider determines that a risk surcharge is needed to offset risk, the operation may include transmitting the one or more verification offers to the payer client device and prompting the payer computing device to confirm the blockchain transaction by selecting at least one of the one or more verification offers and receiving, from the payer client device, a selection of at least one offer of the one or more verification offers (thereby providing a perfected blockchain transaction). The operation may conclude with broadcasting the perfected blockchain transaction to the blockchain network.

In some examples, systems and methods of the present disclosure may leverage the breakthroughs in real-time risk assessment that have been created via high-frequency trading to allow verification providers to compete for individual transaction fees, while isolating the payer from reliance on any single provider.

DETAILED DESCRIPTION

Figure 1A:
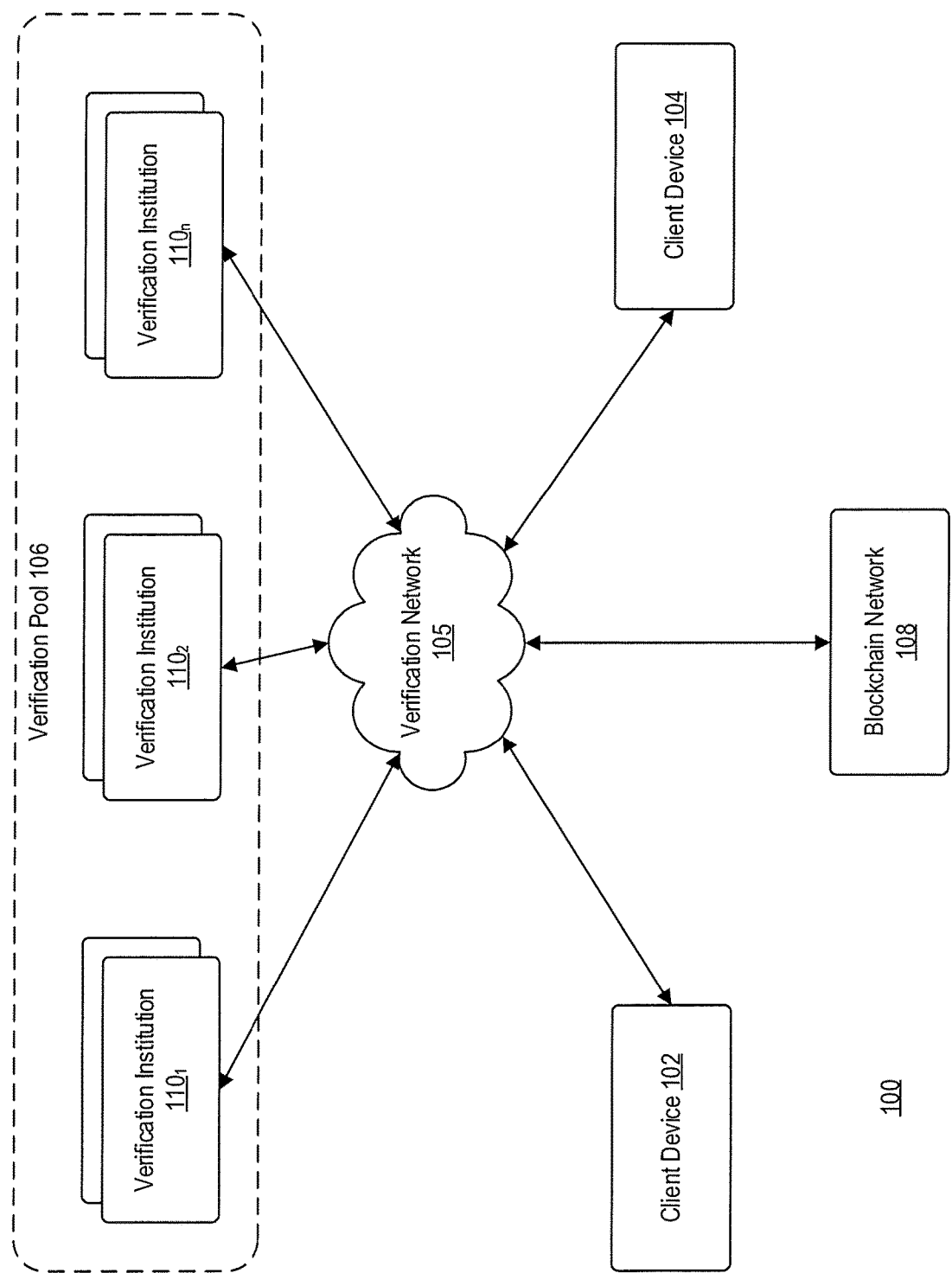
FIG. 1A is a block diagram illustrating a computing environment for authorizing blockchain transactions, according to an exemplary embodiment.

Aspects of the present disclosure relate to systems, methods and non-transitory computer readable media for authorizing a blockchain transaction. In some examples, system may include a verification network in communication with at least a payer computing device associated with a payer, a verification pool that includes one or more independent third-party verification computing systems (e.g., verification providers or verification institutions), and a blockchain network. In some examples, the verification network includes a computing system having a processor and a memory having programming instructions stored thereon, where the programming instructions, when executed by the processor, cause the system to perform an operation for authorizing the blockchain transaction. The operation includes receiving, from the payer computing device, a partially-signed blockchain transaction (e.g., a transaction request). The transaction may include a first signature, where the first signature may be generated by a first private key created and managed by the payer (e.g., a first private key associated with the payer). In one example, the first signature may be the only signature included in the (partially-signed) transaction. In some examples, the partially-signed transaction may be enriched by the verification network with situational details such as (without being limited to) time, value, geolocation, merchant statistics and/or any suitable information that may be useful to a verification provider in analyzing the likelihood of attempted fraud. Since, in an exemplary embodiment of the present disclosure, the payer private key must be protected by the payer, the nature of the present disclosure significantly mitigates the impact of unauthorized access to this payer private key, thereby significantly increasing the attractiveness of existing backup solutions.

The operation of the verification network further includes broadcasting the partially-signed transaction and details relating to one or more pre-agreed threshold parameters (e.g., risk assessment details) to the one or more verification providers. The operation may further include assessing, by at least one verification provider from among the verification pool, the one or more pre-agreed threshold parameters associated with the partially-signed transaction. The assessing may be a part of a broader risk analysis procedure and the threshold parameters may comprise one or more pre-agreed risk parameters. If the pre-agreed threshold parameters are satisfied, the (at least one) verification provider may immediately perfect (e.g., "bless") the transaction request and broadcast the now-perfected blockchain transaction to the blockchain network. Perfecting the transaction request may include generating a second signature using a second private key (e.g., created and maintained by the verification provider) and optionally imposing a pre-agreed surcharge.

In the absence of pre-agreed threshold parameters, or if the pre-agreed threshold parameters are not satisfied during the assessment, the operation may further include generating, by at least one of the one or more verification providers, one or more verification offers including a respective one or more second signatures and, optionally, in some examples, one or more risk-related surcharges. Each of the one or more second signatures may be generated by a respective one of the one or more verification providers using a second private key (e.g., created and maintained by the verification provider). In some embodiments, the one or more verification providers may transmit one or more denials, rather than verification offers.

In an example operation of the present disclosure, the first verification provider to assess the risk and perfect the transaction may prevail and capture a previously-agreed fee. In the event that the risk analysis performed by the verification provider determines that a risk surcharge is needed to offset risk, the operation may include transmitting the one or more verification offers to the payer client device and prompting the payer computing device to confirm the blockchain transaction by selecting at least one of the one or more verification offers and receiving, from the payer client device, a selection of at least one offer of the one or more verification offers (thereby providing a perfected blockchain transaction). The operation may conclude with broadcasting the perfected blockchain transaction to the blockchain network.

In some examples, systems and methods of the present disclosure may leverage the breakthroughs in real-time risk assessment that have been created via high-frequency trading to allow verification providers to compete for individual transaction fees, while isolating the payer from reliance on any single provider.

In conventional blockchain transaction systems, two parties may directly transact with one another. For example, a payee may share a public address (e.g., public key) to which a payer is to transmit an amount of cryptocurrency. The payer may then initiate a transaction that has one or more inputs and one or more outputs. The one or more inputs may correspond to a public key of the payer (e.g., an address from which the cryptocurrency originates) and a signature that was generated using a private key of the payer. The one or more outputs may correspond to the public address of the payee. The transaction may be transmitted to a blockchain network for verification (e.g., to verify that the payer actually has the amount of digital assets, e.g., cryptocurrency, that the payer alleges to have, and that the payer has not transmitted these digital assets).

Such conventional systems, however, suffer from one or more limitations. For example, should a user's private key become compromised (e.g., stolen), the fraudulent party that obtained the user's private key has necessarily stolen all cryptocurrency associated therewith. Further, should a user lose their private key, all cryptocurrency associated therewith is effectively lost.

One or more systems currently exist to combat the limitations of a single signature transaction. For example, one or more systems may provide a multi-signature service. A multi-signature transaction requires that two or more signatures be generated for each transaction. With conventional multi-signature systems, each system functions to provide the additional signature that may be necessary to perfect a transaction. In other words, in a conventional multi-signature service, a signature from the payer and a signature from the multi-signature service is needed for any given transaction.

The one or more techniques disclosed herein provide a verification network that improves upon conventional multi-signature services. For example, the verification network described herein acts as a middleman between parties to a transaction and one or more trusted verification institutions. Upon receiving a transaction request from a payer, the verification network may broadcast a verification request to a pool of pre-defined verification institutions. Each verification institution may be a trusted entity that can "bless" or verify the transaction. At least one signature is needed from the pool of verification institutions to perfect (i.e., "bless") the respective transaction. Accordingly, the system of the present disclosure eliminates dependency on a single entity, as currently required by conventional multi-signature services, and instead relies on a pool, or network, of verification institutions that may verify the transaction. Moreover, the system of the present disclosure also eliminates control over a payer's digital assets that may result from two or more parties colluding to release or take control of the digital assets.

The term "user" as used herein includes, for example, a person or entity that owns a computing device (which may include a wireless device); a person or entity that operates or utilizes a computing device; or a person or entity that is otherwise associated with a computing device (which may include a wireless device). It is contemplated that the term "user" is not intended to be limiting and may include various examples beyond those described.

Moreover, examples of the present disclosure described below refer to blockchain-based transactions involving digital assets such as, for example (but not limited to), cryptocurrency. In general, systems and methods of the present disclosure may be configured to authorize transactions involving any suitable digital asset that may be tokenized, including security tokens, tokenized real estate, and one or more cryptocurrencies (e.g., digital or virtual currency that may use cryptography for security). In general, cryptocurrency may include, without being limited to, Bitcoin, Litecoin, Ether, etc. In fact, for purposes of this disclosure, the term cryptocurrency should be understood to include any digital or virtual assert or currency.

In some examples, transactions with respect to the present disclosure are referred to as blockchain transactions. In other examples, transactions are referred to as cryptocurrency transactions. As used herein, both blockchain transactions and cryptocurrency transactions refer to transactions of cryptocurrency (or any suitable digital asset) that uses a blockchain network.

FIG. 1A is a block diagram illustrating a computing environment 100 for authorizing blockchain transactions, according to an example embodiment. Computing environment 100 may include at least client device 102, client device 104, verification pool 106, verification network 105 and blockchain network 108. Communication among client device 102, client device 104, verification pool 106 and blockchain network 108 may be performed via verification network 105. Although one client device 102 and one client device 104 are shown in FIG. 1A, it is understood that environment 100 may include any number of client devices 102 and/or any number of client devices 104.

In the examples described herein, client device 102 may be operated by a user representing a payer. For example, client device 102 may be a mobile device, a tablet, a desktop computer, or any computing system having the capabilities described herein.

In the examples described herein, client device 104 may be operated by a user representing a payee. For example, client device 104 may be a mobile device, a tablet, a desktop computer, or any computing system having the capabilities described herein.

Client device 102 and client device 104 may communicate with verification network 105. Verification network 105 may be representative of a service that supports multi-signature functionality. In general, multi-signature functionality is a service that requires two or more signatures (e.g., two or more private keys) to authorize a cryptocurrency transaction. Verification network 105 may be configured to store one or more private keys associated with each user or subscriber. For example, verification network 105 may be configured to store one or more private keys associated with at least the payer to a transaction (e.g., client device 102).

Unlike conventional multi-signature services, verification network 105 does not perform the verification of cryptocurrency transactions between parties to a transaction. Rather, verification network 105 may be configured to facilitate the verification thereof by broadcasting a proposed transaction to verification pool 106.

Verification pool 106 may be representative of one or more trusted financial institutions (e.g., verification providers) that may verify a cryptocurrency transaction. In other words, verification pool 106 may include one or more financial institutions that are required to act as a second party to a multi-signature transaction. Verification pool 106 may include one or more verification institutions $110_1$, $110_2$, . . . , $110_n$ (generally "verification institution 110", where n is an integer greater than or equal to 1). In some embodiments, each verification institution 110 may be pre-approved with verification network 105. When a transaction request is received from client device 102 at verification network 105, verification network 105 may broadcast a verification request to each verification institution 110. Each verification institution 110 may then asses a risk associated with verifying the transaction. Based on this assessment, each verification institution 110 may generate a verification offer (described further below) to be transmitted to client device 102. In some embodiments, one or more verification institutions 110 may prompt client device 102 to authenticate with verification institution 110. For example, a verification institution 110 may request verification network 105 to transmit an identification request to the payer (e.g., client device 102) to confirm the identity of the payer for risk analysis purposes. Because each verification institution 110 is competing with one or more other verification institutions 110, each verification institution 110 may race to assess the risk associated with a transaction and generate an offer that competes with other offers. Accordingly, those skilled in the art may readily understand that verification institutions 110 may balance the trade-off between quickly generating a verification offer and accurately assessing a risk associated with the verification offer.

When each verification institution 110 generates a verification offer, verification institution 110 may access a private key associated with the payer (e.g., created and/or managed by the payer) via verification network 105. Each verification institution 110 may then generate a second signature for the transaction, using the private key hosted by verification network 105. The second signature for the transaction may be transmitted by verification institution 110 to verification network 105 with the verification offer. In some examples, the second signature may represent a private key created and/or maintained by verification institution 110 (a verification provider) and/or provided via verification network 105. Accordingly, verification network 105 receives at least two signatures (e.g., a first signature from client device 102 and a second signature from each verification institution 110) which are required for the transaction.

In some embodiments, each verification institution 110 may have a pre-established relationship with a user (or subscriber) of verification network 105. For example, each verification institution 110 may prompt the user to submit a verification application, such that each verification institution 110 may vet the user similar to a credit card application process. Accordingly, for each user, each verification institution 110 may set one or more pre-arranged limits, parameters, or contractual duties for each transaction. For example, for a given user, verification institution 110 may set a transaction limit of Bitcoin, Litecoin, Ether, etc. to a transaction. In another example, a verification institution 110 may attempt to limit its liability to a transaction, by contractually agreeing with each user that verification institution 110 is only liable for up to 50% of the transaction amount. Accordingly, when selecting a verification offer, a user may base the decision on, for example, which verification institution 110 offers the best refund policy.

Verification network 105 may receive the one or more verification offers from the one or more verification institutions 110 (i.e., verification instate $110_1$, $110_2$, . . . , $110_n$). Verification network 105 may transmit the one or more verification offers to client device 102 and prompt client device 102 to select an offer among the verification offer(s). Verification network 105 may receive from client device 102 an indication of a selection of a particular verification offer. Verification network 105 may then broadcast the transaction to blockchain network 108 (responsive to the selected offer) for posting. Blockchain network 108 may include one or more computing devices for processing a blockchain transaction, by generating a block that is added to a blockchain that includes a record for the transaction. The blockchain represents a decentralized, public ledger of all transactions of a blockchain-based currency.

The role played by verification institution 110 is similar to a verifier of a transaction. For example, verification institution 110 may be responsible for verifying that the payer (e.g., client device 102) is indeed the payer and that the payer has the alleged amount of cryptocurrency for the transaction.

In conventional blockchain systems, transactions between a payer and payee are irreversible, because once a payer relinquishes control of the amount of cryptocurrency, the payer can only be made whole if the payee agrees to refund the payer. The present system addresses this limitation by providing an intermediary verification network 105 and verification pool 106. When one or more verification institutions 110 assess a risk associated with a particular transaction, proposes a verification offer, and receives an acceptance of that verification offer, the respective verification institution 110 has taken responsibility for the transaction. In other words, if a fraudulent third party gained access to the payer's account, verification institution 110 is responsible for making the payer whole (i.e., refunding the payer the amount transferred to the payee). In this manner, verification institution 110 (e.g., a verification provider) may "eat the charges" for any risk miscalculations, thereby reducing the impact of fraud on the payer. Moreover, because various verification institutions 110 (e.g., verification providers) of verification pool 106 may compete to perfect a transaction through one or more verification offers, environment 100 may spread out any risk miscalculations among the verification providers of verification pool 106, thereby reducing any concentration risk that is conventionally posed by relying on a single verification service provider.

Further, because verification network 105 supports multi-signature functionality, for each transaction, two or more signatures are necessary to perfect the transaction. In conventional multi-signature systems (e.g., two-signature system), any individual party that has access to at least two of the payer's private keys may take control of the payer's cryptocurrency. Similarly, in conventional systems, any two actors may collude to release or take control of an individual's cryptocurrency by gaining access to at least two private keys of the individual. The present disclosure addresses these limitations of conventional systems by anticipating the possibility that, when the proposed transaction is broadcast to verification pool 106, two or more verification institutions 110 may collude to release the payer's funds. To address this, the computing device associated with the payer (e.g., client device 102) is a mandatory party to the transaction. In other words, even though one or more verification institutions 110 in verification pool 106 may collude and provide the necessary number of signatures required for a specific multi-signature transaction, verification network 105 will not perfect the transaction without receiving a signature from the payer.

Examples of client device 102, verification network 105 and verification institution $110_n$ are described further below with respect to FIG. 2.

Figure 1B:
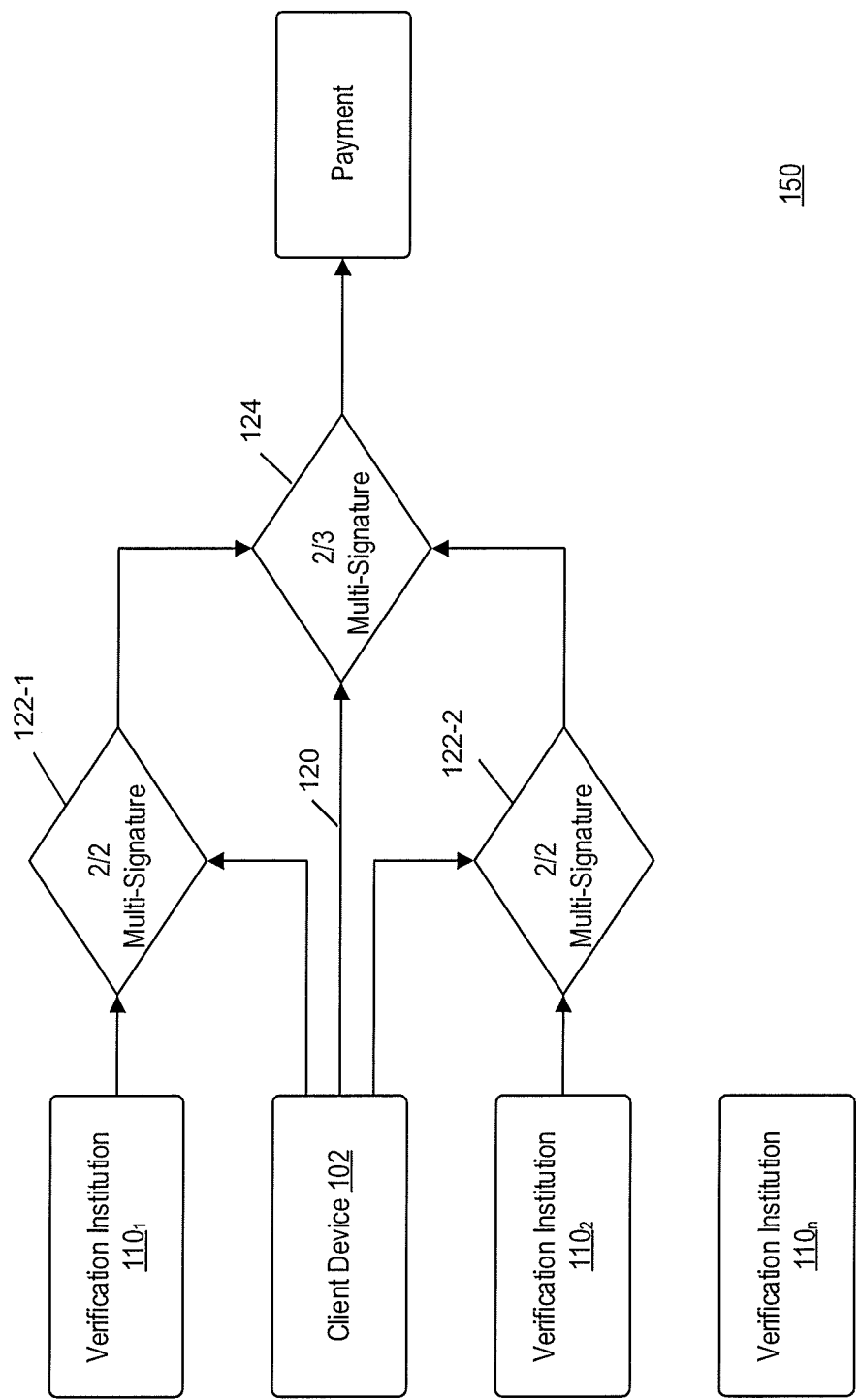
FIG. 1B is a block diagram visually depicting one or more parties to a blockchain transaction, according to an exemplary embodiment.

FIG. 1B is a block diagram 150 visually depicting one or more parties to a cryptocurrency transaction, according to example embodiments. As shown, block diagram 150 includes verification institution $110_1$, verification institution $110_2$, and verification institution $110_n$ as the one or more verification institutions 110. For this transaction, at least two signatures are needed to perfect the transaction from payer to payee.

As illustrated, the verification offers 122-1 and 122-2 submitted by institution $110_1$ and institution $110_2$, respectively, have been selected by payer (e.g., client device 102). In conventional systems, because a minimum of two signature are required, the signature (2/2) generated by verification institution $110_1$ and the signature (2/2) generated by verification institution $110_2$ would be sufficient to perfect the transaction. Those skilled in the art may readily understand that, if verification network 105 were compromised, and two or more private keys associated with client device 102 were accessed, verification institution $110_1$ and verification institution $110_2$ could collude to release or gain access to the payer's cryptocurrency. However, such signatures would not be sufficient to perfect the transaction in computing environment 100 because client device 102 (including signature 120 generated by client device 102) is a mandatory party to the transaction. Accordingly, at least one of the at least two required signatures must be generated by client device 102 (or more generally, the payer). Thus, in the example shown in FIG. 1B, signatures 124 to perfect the transaction (e.g., for payment) includes signatures (2/3) (i.e., signature 120 of client device 102 and signatures (2/2) of respective verification institutions $110_1$.$110_2$).

Figure 2:
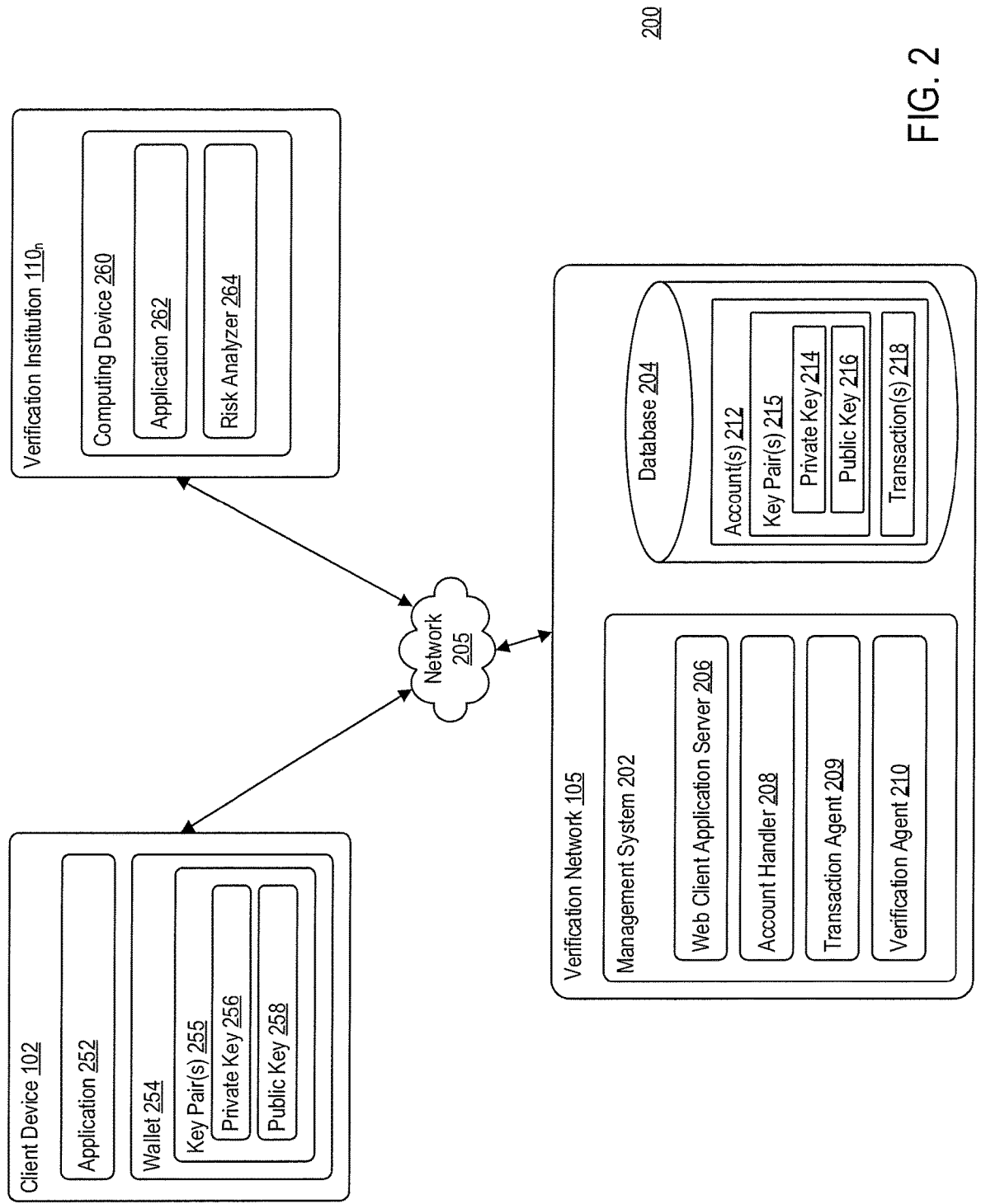
FIG. 2 is a block diagram illustrating a computing environment for authorizing blockchain transactions including a verification network, according to an exemplary embodiment.

FIG. 2 is a block diagram illustrating computing environment 200 for authorizing blockchain transactions, according to one or more exemplary embodiments. As illustrated, computing environment 200 includes at least client device 102, at least one verification institution 110, and verification network 105. Client device 102, verification institution 110 and verification network 105 may communicate via at least one network 205.

Network 205 may be of any suitable type, including individual connections via the Internet, such as cellular or Wi-Fi networks. In some embodiments, network 205 may connect terminals, services, and mobile devices using direct connections, such as, without being limited to, radio frequency identification (RFID), near-field communication (NFC), Bluetooth™, low-energy Bluetooth™ (BLE), Wi-Fi™, ZigBee™, ambient backscatter communication (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore, the network connections may be selected for convenience over security.

Network 205 may include any type of computer networking arrangement used to exchange data. For example, network 205 may be the Internet, a private data network, a virtual private network using a public network and/or other suitable connection(s) that enables components in computing environment 200 to send and receive information therebetween.

Client device 102 may include application 252 and wallet 254. Application 252 may be representative of a web browser that allows access to a website or a stand-alone application. Client device 102 may access application 252 to access functionality of verification network 105. Client device 102 may communicate over network 205 to request a webpage, for example, from web client application server 206 of verification network 105. For example, client device 102 may be configured to execute application 252 to access one or more functionalities of verification network 105. The content that is displayed to client device 102 may be transmitted from web client application server 206 to client device 102, and subsequently processed by application 252 for display through an interactive graphical user interface (GUI) rendered by client device 102.

Wallet 254 may be representative of a digital storage location on client device 102. Wallet 254 may be configured to store one or more key pairs 255 associated with a user's blockchain account (e.g., account 212). As illustrated, each key pair 255 may include a private key 256 and a corresponding public key 258.

Each private key 256 may be an alphanumeric string that allows a user of client device 102 to transmit (e.g., spend) one or more cryptocurrencies to another individual or entity (i.e., another cryptocurrency address). Private key 256 may be used to sign each cryptocurrency transaction. For example, a user may input private key 256 into a signature algorithm which outputs a signature that may be verified by verification network 105. Any individual or entity that has access to private key 256 may be able to access the one or more cryptocurrencies corresponding to private key 256.

Each public key 258 may correspond to a respective private key 256. In some embodiments, public key 258 may be derived from its respective private key 256. Public key 258 may be an alphanumeric string that corresponds to a public address of an individual or entity. For example, when a payer or transmitter attempts to transmit an amount of cryptocurrency to a user of client device 102, the payer or transmitter directs the transmittal to the address defined by public key 258. Public key 258 may be public because, although derived from a respective private key 256, it is near impossible to reverse engineer private key 256.

Verification network 105 may include management system 202 and database 204. Management system 202 may be representative of a computing system. Management system 202 may include web client application server 206, account handler 208, transaction agent 209, and verification agent 210.

Each of account handler 208, transaction agent 209, and verification agent 210 may be comprised of one or more software modules. The one or more software modules may be collections of code or instructions stored on a media (e.g., memory of management system 202) that represent a series of machine instructions (e.g., program code) that implements one or more algorithmic steps. Such machine instructions may be the actual computer code that a processor of management system 202 interprets to implement the instructions or, alternatively, may be a higher level of coding of the instructions that is interpreted to obtain the actual computer code. The one or more software modules may also include one or more hardware components. One or more aspects of the algorithm may be performed by the hardware components (e.g., circuitry) itself, rather than as a result of an instruction.

Account handler 208 may be configured to manage one or more accounts 212 associated with one or more users. For example, account handler 208 may communicate with database 204. As illustrated, database 204 may include one or more accounts 212. Each account 212 may include one or more key pairs 215 and one or more transactions 218. Each key pair 215 may include a private key 214 and a corresponding public key 216. Account handler 208 may generate one or more key pairs 215 upon a user registering with verification network 105. In some embodiments, account handler 208 may generate one or more key pairs 255 stored on client device 102.

Each private key 214 may be an alphanumeric string that allows one or more verification institutions 110 to verify a particular transaction request. Private key 214 may be used to sign each cryptocurrency transaction. For example, a verification institution 110 may access a private key 214 from verification network 105, and input private key 214 into a signature algorithm which outputs a signature that may be verified by verification network 105. Any individual or entity that has access to private key 214 may be able to access the one or more cryptocurrencies corresponding the private key 214.

Each public key 216 may correspond to a respective private key 214. In some embodiments, public key 216 may be derived from its respective private key 214. Public key 216 may be an alphanumeric string that corresponds to a public address associated with an individual or entity. For example, when a verification institution 110 assesses a risk associated with a transaction request, verification institution 110 may identify a payer using public key 216. Public key 216 may be public because, although derived from a respective private key 214, it is near impossible to reverse engineer private key 214.

Transaction agent 209 may be configured to manage one or more transactions 218 associated with each account 212. For example, transaction agent 209 may act as a "middleman" between client device 102 and one or more verification institutions 110. In operation, for example, transaction agent 209 may transmit a transaction request to one or more verification institutions 110. Each of the one or more verification institutions 110 may race to assess the risk associated with verifying the transaction, and provide an offer to the payer for verifying the transaction. For example, each of the one or more verification institutions 110 may transmit to verification network 105 a willingness to verify the transaction along with a fee for their verification (e.g., a verification offer). The verification offer may, in turn, be transmitted from verification network 105 to client device 102 for display. Upon receiving input from client device 102 that corresponds to a selection of a verification offer, verification network 105 may transmit the offer acceptance to the respective verification institution 110.

After a transaction is finalized between a payer (e.g., client device 102) and a payee (e.g., client device 104), transaction agent 209 may record the transaction in database 204. For example, transaction agent 209 may record the payer to the transaction and the payee to the transaction, along with the transaction amount, in one or more transactions 218. Accordingly, if, for example, the transaction was later deemed fraudulent, transaction agent 209 may notify the verification institution 110 that verified the transaction, such that verification institution 110 can reimburse the payer to the transaction.

Verification agent 210 may be configured to verify one or more transactions between a payer (e.g., client device 102) and a payee (e.g., client device 104). Verification agent 210 may, for example, verify a first signature transmitted from client device 102 to verification network 105 that signals the initiation of the transaction. The first signature may correspond to a first signature needed for a multi-signature transaction. Verification agent 210 may further be configured to verify a second signature transmitted from a verification institution 110, in response to generation of a verification offer from verification institution 110. The second signature may correspond to a second signature (or additional signature) needed for a multi-signature transaction.

Upon receiving the necessary number of signatures required for the multi-signature transaction (e.g., two or more signatures), verification institution 110 may communicate with transaction agent 209 to complete the transaction. Transaction agent 209 may broadcast the completed transaction to blockchain network 108, such that the transaction may be posted thereto.

Verification institution 110 may be representative of a computing system associated with any suitable entity such as, for example, a particular financial institution or other trusted entity. Verification institution 110 may include computing device 260. Computing device 260 may be a mobile device, a tablet, a desktop computer, or any computing system having the capabilities described herein. Computing device 260 may include application 262 and risk analyzer 264.

Application 262 may be representative of a web browser that allows access to a website or a stand-alone application. Computing device 260 may access application 262 to access functionality of verification network 105. Computing device 260 may communicate over network 205 to request a webpage, for example, from web client application server 206 of verification network 105. For example, computing system 260 may be configured to execute application 262 to access one or more functionalities of verification network 105. The content that is displayed to computing device 260 may be transmitted from web client application server 206 to computing device 260, and subsequently processed by application 262 and, in some examples, may be displayed through a GUI rendered by computing system 260.

Risk analyzer 264 may be comprised of one or more software modules. The one or more software modules may be collections of code or instructions stored on a media (e.g., memory of computing device 260) that represent a series of machine instructions (e.g., program code) that implements one or more algorithmic steps. Such machine instructions may be the actual computer code a processor of computing device 260 interprets to implement the instructions or, alternatively, may be a higher level of coding of the instructions that is interpreted to obtain the actual computer code. The one or more software modules may also include one or more hardware components. One or more aspects of the algorithm may be performed by the hardware components (e.g., circuitry) itself, rather than as a result of an instruction.

Risk analyzer 264 may be configured to assess a risk associated with verifying a cryptocurrency transaction between the payer (e.g., client device 102) and the payee (e.g., client device 104). In some embodiments, risk analyzer 264 may asses the risk associated with verifying the cryptocurrency transaction by taking in account one or more parameters that include, but are not limited to, a current location of client device 102 (e.g., at a location associated with the user), an amount of cryptocurrency to be transmitted, a frequency of transactions between the payer (e.g., client device 102) and the payee (e.g., client device 104), the identity of the payee (e.g., a merchant), the time of day of the transaction, a purchase history of the payer, and the like. In some examples, risk analysis by risk analyzer 264 may include contacting the payer (e.g., via a call or text) to confirm the transaction. Based on the risk assessment performed by risk analyzer 264, verification institution 110 may generate a verification offer to be transmitted to client device 102.

Because, however, verifying the transaction may subject verification institution 110 to financial risk (e.g., if the transfer from client device 102 to client device 104 was fraudulent), verification institution 110 may charge the payer a fee for their verification service. For example, when risk analyzer 264 determines that there is minimal risk associated with verifying the transaction, verification institution 110 may propose a minimal fee to client device 102 in the verification offer. In another example, when risk analyzer 264 determines that there is a higher risk associated with verifying the transaction, verification institution 110 may propose a higher fee to client device 102 in the verification offer. Further, in some embodiments, verification institution 110 may propose a surge fee to a transaction. For example, in those embodiments in which verification network 105 broadcasts a higher volume of verification requests, verification institution 110 may propose a surge fee for its services.

Figure 3:
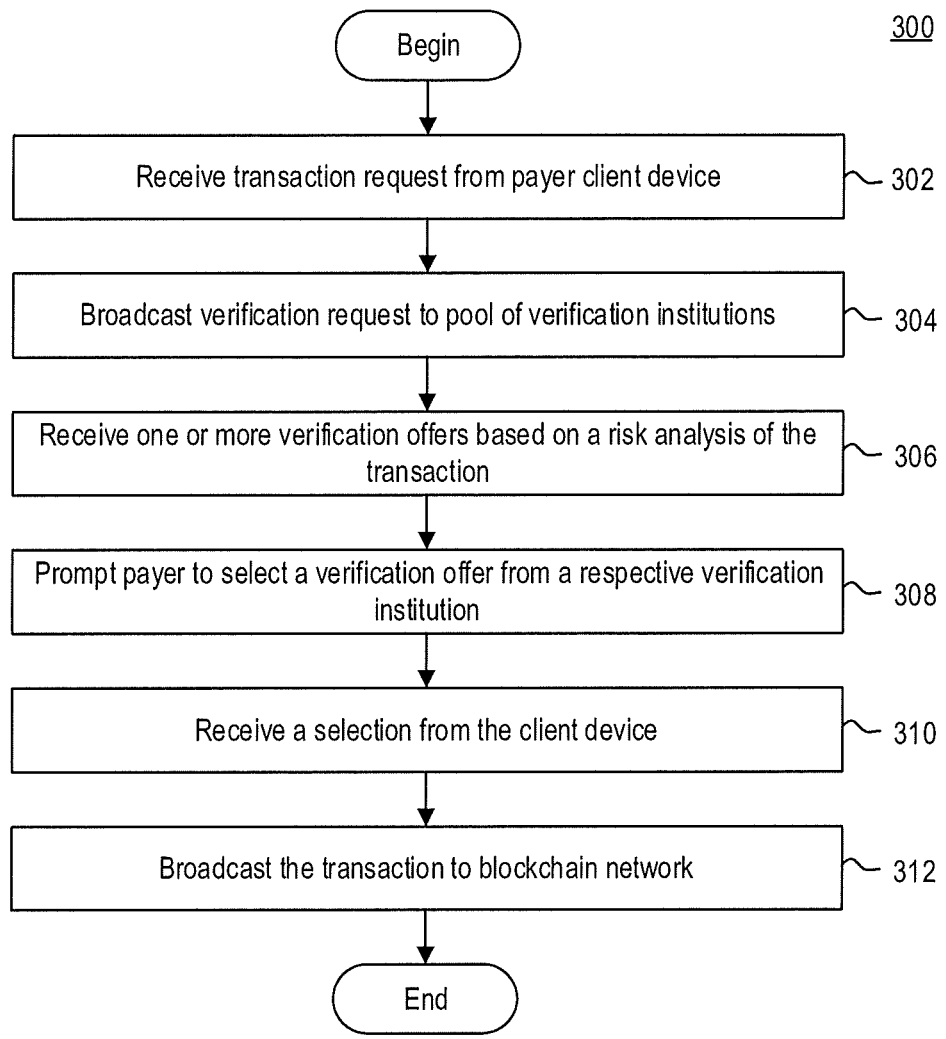
FIG. 3 is a flow diagram illustrating a method of authorizing a blockchain transaction using a verification network, according to one or more exemplary embodiments.

FIG. 3 is a flow diagram illustrating a method 300 of authorizing a blockchain transaction using verification network 105, according to one or more exemplary embodiments. Method 300 may begin at step 302.

At step 302, verification network 105 may receive a transaction request from client device 102 (e.g., via a payment card, an application, a mobile phone, online, etc.). The transaction request may include at least a designation of the payer (e.g., client device 102), the payee (e.g., client device 104), and the amount of cryptocurrency specified in the transaction. For example, the transaction request may include a public address (e.g., public key 258) corresponding to client device 102, a signature generated by client device 102 using private key 256), a public address corresponding to client device 104, and the amount specified in the transaction. Further, in some embodiments, the transaction request may also specify a number of signatures required for the multi-signature authorization. For example, in some embodiments, the transaction request may specify that at least one verification institution 110 is necessary for verification. In another example, the transaction request may specify that at least two of the verification institutions 110 are necessary for verification. In some examples, the transaction request may represent a partially-signed blockchain transaction, that may include a first signature generated by the client device 102 using private key 256, but may not include any second signatures needed to perfect the blockchain transaction.

At step 304, verification network 105 may broadcast a verification request to verification pool 106. The verification request may include one or more parameters associated with the transaction request. Such parameters may include, but are not limited to, the public address (e.g., public key 258) corresponding to client device 102, a public address associated with client device 104, and the amount specified in the transaction. In some examples, verification network 105 may determine and include situational details associated with the partially-signed transaction that may be useful (to verification pool 106) in analyzing a likelihood of attempted fraud. Non-limiting examples of situational details may include a time of the transaction, a value of the transaction, a geolocation of client device 102, any merchant statistics, etc. In some examples, the verification request broadcast by verification network 105 may include the partially-signed transaction (from client device 102) and any additional information and/or risk assessment details (e.g., parameters, situational details, etc.) provided by verification network 105. Thus, in some examples, the partially-signed transaction may be enriched by the information provided by verification network 105. In some embodiments, the one or more parameters may further include a number of additional signatures needed from verification pool 106 to complete the multi-signature transaction.

At step 306, verification network 105 may receive one or more verification offers based on a risk analysis of the transaction request. For example, verification network 105 may receive one or more verification offers from one or more verification institutions 110 to be transmitted to client device 102. Each verification offer may be generated by a verification institution 110 based on a determined risk with verifying the transaction. Each verification offer may include a verification charge associated therewith.

At step 308, verification network 105 may prompt the payer to select a verification offer from a respective verification institution 110. Verification network 105 may transmit the one or more verification offers to client device 102 for display. Client device 102 may, in turn, push the one or more verification offers to client device 102, prompting the payer to select from among the one or more verification offers.

At step 310, verification network 105 may receive, from client device 102, an indication of a selection of at least one verification offer. For example, client device 102 may receive input via a GUI displayed thereon, which corresponds to a selection of a verification offer from a particular verification institution 110. Client device 102 may translate the input to a message that is transmitted to verification network 105. The message may indicate the verification offer selected by the payer.

At step 312, verification network 105 may broadcast the transaction between client device 102 and client device 104 to blockchain network 108. For example, upon determining that the necessary number of signatures required by the transaction request is met, verification network 105 may transmit the transaction between payer and payee to blockchain network 108 for posting to the blockchain. In some examples, the transaction may also take into account any surcharge fee associated with the selected verification offer(s).

In some examples, the verification request (step 304) may include the partially-signed transaction (e.g., the transaction request) and details relating to one or more pre-agreed threshold parameters (e.g., risk assessment details). Responsive to the broadcasted verification request (step 304), at least one verification institution 110 (e.g., verification institution 110₂) among verification pool 106 may assess the pre-agreed threshold parameter(s) associated with the partially-signed transaction. The assessing may be a part of a broader risk analysis procedure and the threshold parameter(s) may comprise one or more pre-agreed risk parameters. If the pre-agreed threshold parameter(s) are satisfied, the (at least one) verification institution 110 (e.g., verification institution 110₂) may immediately perfect (e.g., "bless") the transaction request and broadcast the now-perfected blockchain transaction to blockchain network 108 (e.g., bypassing steps 306-310). Perfecting the transaction request may include generating a second signature using a second private key (e.g., created and maintained by the verification provider) and optionally imposing a pre-agreed surcharge. In some examples, verification institution 110 (e.g., verification institution 110₂) may broadcast the perfected transaction directly to blockchain network 108 and/or via verification network 105. In some examples, a first verification institution 110 (e.g., verification institution 110₂) to assess the risk, perfect the transaction (according to the previously-agreed upon fee) and broadcast the perfected transaction (e.g., the now fully-signed transaction including the first signature from client device 102 and the second signature from verification institution 110₂) may prevail and capture the previously-agreed fee.

In the absence of pre-agreed threshold parameter(s), or if the pre-agreed threshold parameter(s) are not satisfied during the assessment, the operation may further include generating, by at least one of verification institutions 110, a respective one or more verification offer(s) including a respective one or more second signatures and, optionally, in some examples, one or more risk-related surcharges. Each of the second signature(s) may be generated by a respective one of verification institutions 110 using a respective second private key (e.g., created and maintained by a respective verification institution 110). The verification offer(s) may be transmitted to and received by verification network 105 (step 306) and step 306 may proceed to steps 308-310 (as discussed above). In some embodiments, verification institution(s) 110 may transmit one or more denials, rather than verification offers. Thus, in some examples, when verification institution(s) 110 determine, from the risk analysis, that a risk surcharge is needed to offset risk, the verification offer(s) may include the requested surcharge and an indication to prompt client device 102 to select a verification offer. Based on the indication to prompt the payer, verification network 105 may prompt client device 102 to select a verification offer and may receive a selection from client device 102 (as described above at steps 308-310). Responsive to the selection from client device 102, verification network 105 may then broadcast the now perfected transaction (e.g., including the first signature from client device 102 and the second signature in the selected verification offer) to blockchain network 108 (step 312). In this manner, verification network 105 may cause the payer (via client device 102) to confirm the blockchain transaction.

Figure 4:
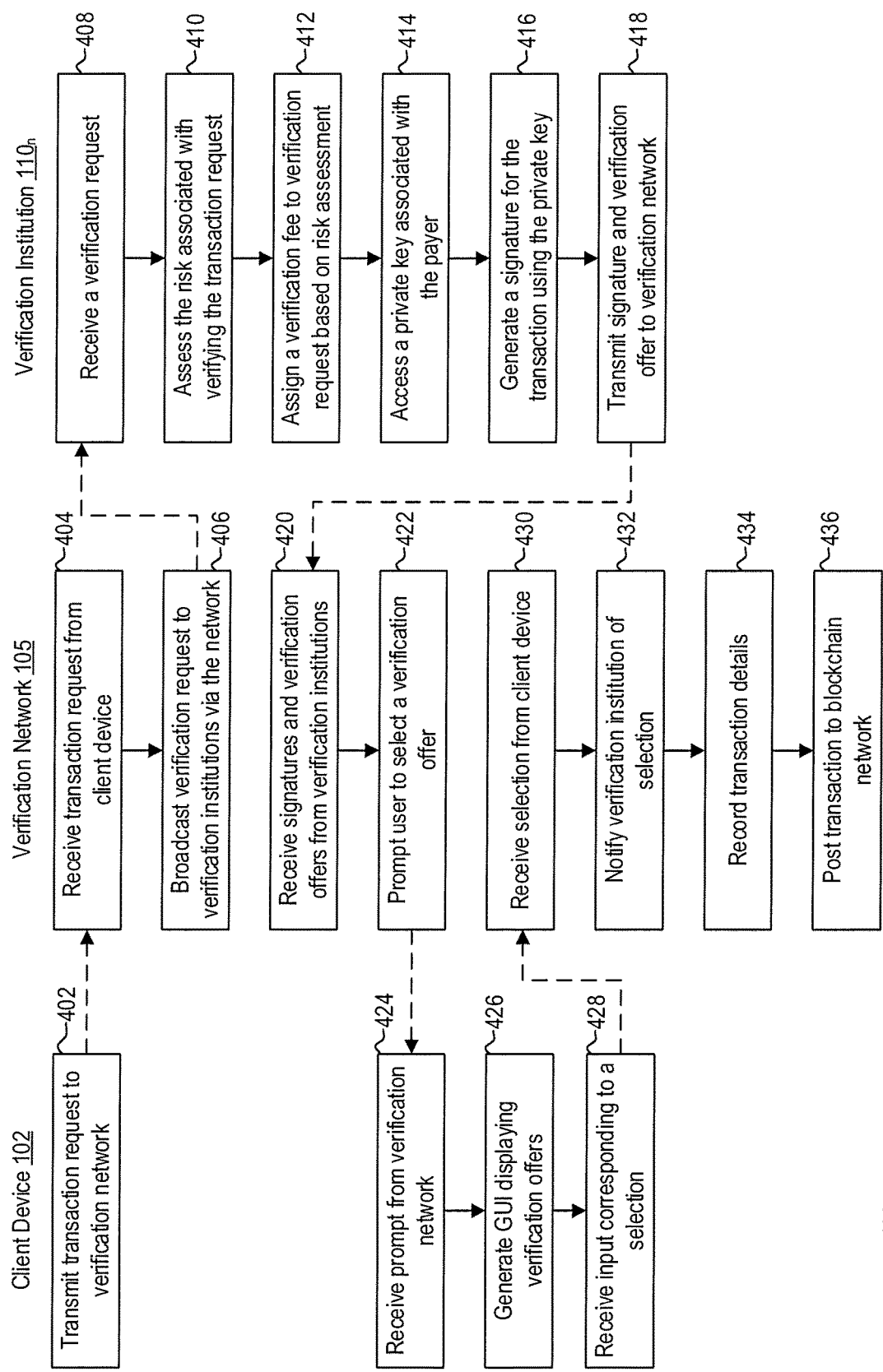
FIG. 4 is a flow diagram illustrating communication among one or more computing components for authorizing a blockchain transaction using a verification network, according to one or more exemplary embodiments.

FIG. 4 is a flow diagram illustrating a method 400 of communication among one or more computing components for authorizing a blockchain transaction using verification network 105, according to one or more exemplary embodiments. Method 400 may begin at step 402.

At step 402, client device 102 may transmit a transaction request to verification network 105. The transaction request may include at least a designation of the payer (e.g., client device 102), the payee (e.g., client device 104), and the amount of cryptocurrency specified in the transaction. For example, the transaction request may include a public address (e.g., public key 258) corresponding to client device 102, a signature generated by client device 102 using private key 256), a public address corresponding to client device 104, and the amount specified in the transaction. Further, in some embodiments, the transaction request may also specify a number of signatures required for the multi-signature authorization. For example, in some embodiments, the transaction request may specify that at least one verification institution 110 is necessary for verification. In another example, the transaction request may specify that at least two of the verification institutions 110 is necessary for verification.

At step 404, verification network 105 may receive the transaction request from client device 102. In some embodiments, upon receiving the transaction request from client device 102, verification network 105 may verify that the payer has indeed signed the transaction. For example, verification network 105 may verify that client device 102 transmitted the signature for the transaction.

At step 406, verification network 105 may broadcast a verification request to verification pool 106. The verification request may include one or more parameters associated with the transaction request. Such parameters may include, but are not limited to, the public address (e.g., public key 258) corresponding to client device 102, a public address associated with client device 104, and the amount specified in the transaction. In some embodiments, the one or more parameters may further include a number of additional signatures needed from verification pool 106 to complete the multi-signature transaction.

At step 408, verification institution 110 may receive the broadcasted verification request from verification network 105. Although the below operations are discussed generally with respect to one or more verification institutions 110, those skilled in the art may readily understand that it is not required for all verification institutions 110 in verification pool 106 to perform all of the operations described below.

At step 410, verification institution 110 may asses a risk associated with verifying the transaction request. For example, risk analyzer 264 may be configured to assess a risk associated with verifying the cryptocurrency transaction between the payer (e.g., client device 102) and the payee (e.g., client device 104). In some embodiments, risk analyzer 264 may asses the risk associated with verifying the cryptocurrency transaction by taking in account one or more parameters that include, but are not limited to, a current location of client device 102 (e.g., at a location associated with the user), an amount of cryptocurrency to be transmitted, a frequency of transactions between the payer (e.g., client device 102) and the payee (e.g., client device 104), and the like. Based on the risk assessment performed by risk analyzer 264, verification institution 110 may generate a verification offer to be transmitted to client device 102.

At step 412, verification institution 110 may assign a verification fee to the verification offer based on the risk assessment analysis. For example, verification institution 110 may assign a fee to their verification service based on the risk associated with verifying a particular transaction. For example, if risk analyzer 264 determines that there is minimal risk associated with verifying the transaction, verification institution 110 may propose a minimal fee to client device 102 in the verification offer. In another example, if risk analyzer 264 determines that there is a higher risk associated with verifying the transaction, verification institution 110 may propose a higher fee to client device 102 in the verification offer.

At step 414, verification institution 110 may access a private key associated with the payer. For example, upon generating a verification offer, verification institution 110 may request from verification network 105 a private key (e.g., private key 214) that is hosted by verification network 105 and associated with the payer (e.g., client device 102).

At step 416, verification institution 110 may generate a signature using the accessed private key. For example, verification institution 110 may generate a second (or third, fourth, etc.) signature for the transaction using private key 214. By generating a second signature prior to transmitting the verification offer to client device 102, the transaction may be completed as soon as the payer selects a verification offer.

At step 418, verification institution 110 may transmit the verification offer and the second (or additional) signature to verification network 105. At step 420, verification network 105 may receive the verification offer and the second signature from verification institution 110.

At step 422, verification network 105 may prompt the payer to select a verification offer from a respective verification institution 110. Verification network 105 may transmit the one or more verification offers to client device 102 for display. The verification offer may include the verification fee associated therewith.

At step 424, client device 102 may receive the prompt from verification network 105. For example, client device 102 may receive the one or more verification offers from verification network 105 via application 252 executing thereon.

At step 426, client device 102 may generate a GUI displaying the one or more verification offers. The GUI generated by client device 102 may be displayed to the payer via a display associated with client device 102. For example, the GUI may be displayed via an external display device (e.g., a monitor) associated with client device 102. In another embodiment, the GUI may be displayed via a touchscreen associated with client device 102. The GUI may include the one or more verification offers and the one or more verification fees associated therewith.

At step 428, client device 102 may receive an input that corresponds to a selection among the verification offer(s). For example, client device 102 may receive an input, via the GUI, a selection of a verification offer. At step 430, client device 102 may transmit a verification offer acceptance to verification network 105.

At step 430, verification network 105 may receive the selection of the verification offer acceptance from client device 102. At step 432, verification network 105 may notify a respective verification institution 110 of the verification offer acceptance. For example, verification network 105 may transmit a message to a respective verification institution 110 associated with the verification offer.

At step 434, verification network 105 may record the transaction details in database 204. for example, verification network 105 may record the transaction date, the transaction amount, the payer public address, the payee public address, any verification fees and one or more verification institutions 110 associated with one or more accepted verification offers in database 204. By recording the transaction details in database 204, should the transaction later be deemed fraudulent (e.g., a fraudulent third party obtained the payer's private key (e.g., private key 256), the transaction may be reversible. For example, the one or more verification institutions 110 whose verification offers were accepted are now liable for refunding the payer the transaction amount.

At step 436, verification network 105 may broadcast/post the transaction between client device 102 and client device 104 to blockchain network 108. For example, upon determining that the necessary number of signatures required by the transaction request is met, verification network 105 may transmit the transaction between payer and payee to blockchain network 108 for posting to the blockchain. In some examples, the transaction may also reflect any verification fees.

Although not shown in FIG. 4, as discussed above, in some examples, after step 408 (e.g., at step 410), verification institution(s) 110 may assess pre-agreed threshold parameter(s) associated with the transaction request and determine whether the pre-agreed threshold parameter(s) have been satisfied. If at least one of verification institutions 110 determine that the pre-agreed threshold parameter(s) are satisfied, the at least one verification institution 110 may perfect the blockchain transaction (as discussed above) and broadcast the perfected blockchain transaction to blockchain network 108 (thereby bypassing, for example, steps 412-434). If the pre-agreed threshold parameter(s) are not satisfied, the process may proceed according to steps 412-436.

Figure 5B:
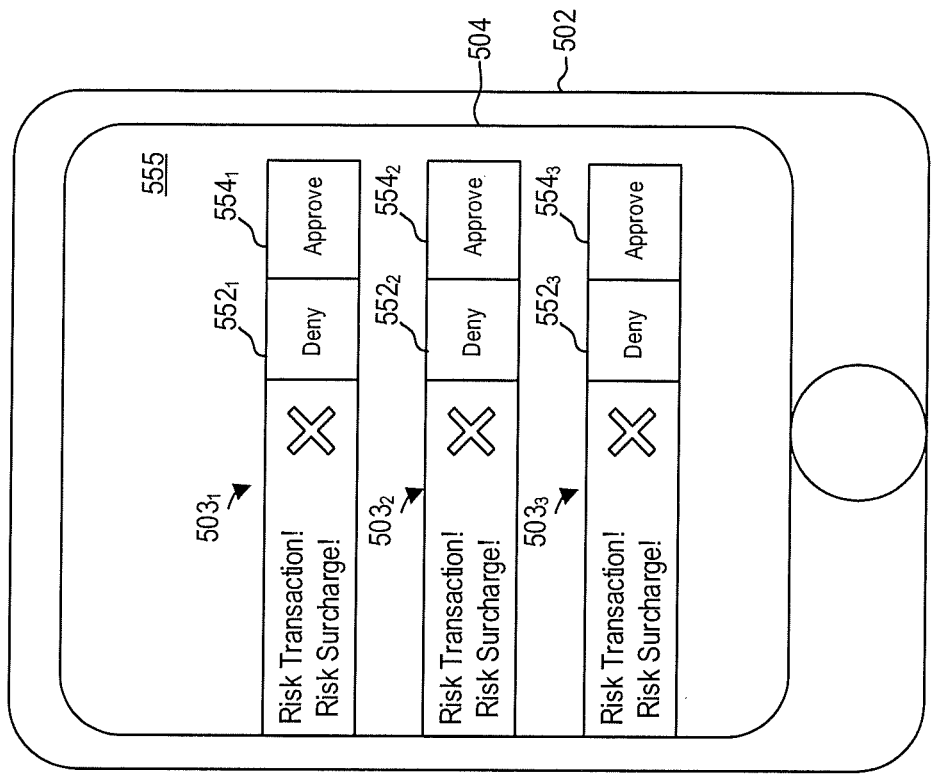
FIG. 5B is a block diagram illustrating one or more screenshots of a client computing device, according to one or more exemplary embodiments.
Figure 5A:
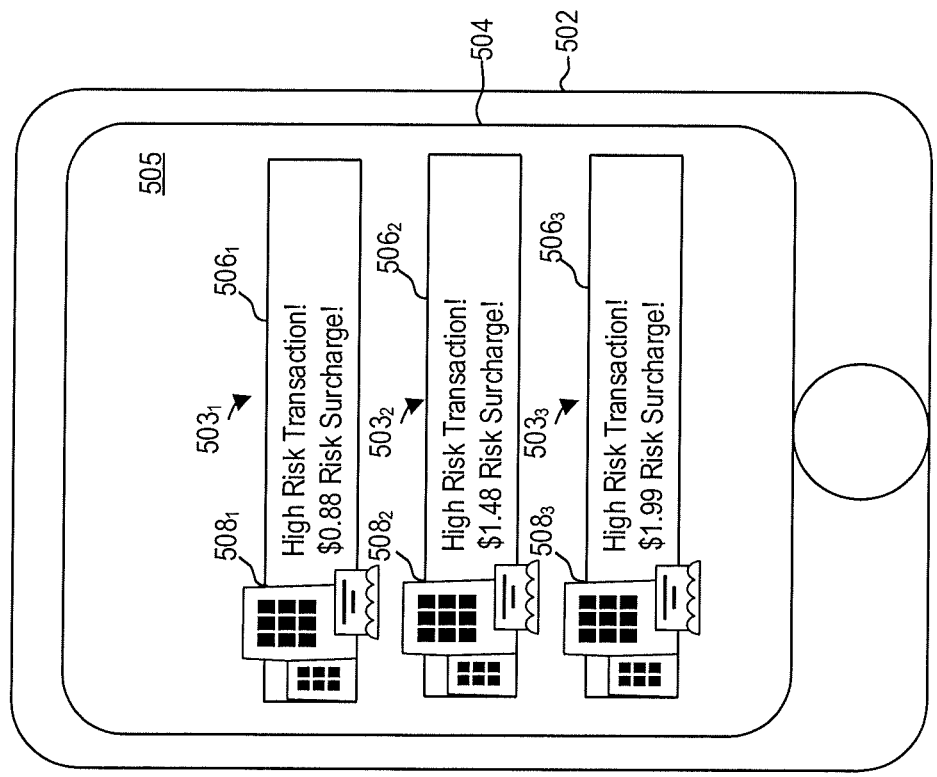
FIG. 5A is a block diagram illustrating one or more screenshots of a client computing device, according to one or more exemplary embodiments.

FIG. 5A is a block diagram 500 illustrating one or more screenshots of client computing device 502, according to one or more exemplary embodiments. As illustrated, client device 502 may be a mobile device associated with a payer. For example, client device 502 may be associated with client device 102 (explained in detail above). Client device 502 may include display 504. Display 504 may be currently displaying screenshot 505. Screenshot 505 may illustrate an example GUI that may be generated and displayed to the payer upon receiving one or more verification offers from verification network 105.

As shown, screenshot 505 includes one or more verification offers $503_1$, $503_2$, and $503_3$ (generally "verification offer 503"). Verification offer $503_1$ may include a graphic $508_1$ associated with a verification institution $110_1$ and verification fee $506_1$ associated therewith. Verification offer $503_2$ may include a graphic $508_2$ associated with a verification institution $110_2$ and verification fee $506_2$ associated therewith. Verification offer $503_3$ may include a graphic $508_3$ associated with a verification institution $110_3$ and verification fee $506_3$ associated therewith. Each verification offer 503 may be selectable by the payer.

FIG. 5B is a block diagram 550 illustrating one or more screenshots of client computing device 502, according to one or more exemplary embodiments. As illustrated, display 504 of client device 502 may be currently displaying screenshot 555. Screenshot 555 may illustrate an example GUI that may be generated and displayed to the payer upon the payer providing input accepting or rejection a verification offer.

As shown, when a payer provides a select and drag input (e.g., swipe right) the display may update to reveal screenshot 555. The payer may be prompted with one or more options for each verification offer 503. For example, verification offer $503_1$ may include a graphic $552_1$ associated with a rejection of the verification offer (e.g. "deny") and graphic $554_1$ associated with an approval of the verification offer (e.g. "approve"). Verification offer $503_2$ may include a graphic $552_2$ associated with a rejection of the verification offer (e.g. "deny") and graphic $554_2$ associated with an approval of the verification offer (e.g. "approve"). Verification offer $503_3$ may include a graphic $552_3$ associated with a rejection of the verification offer (e.g. "deny") and graphic $554_3$ associated with an approval of the verification offer (e.g. "approve").

Upon receiving an input via graphic 552 or graphic 554, client device 102 may transmit to verification network 105 a rejection or approval of each verification offer.

It is understood that FIGS. 5A and 5B illustrate an example arrangement, presentation and selection operations of verification offers 503 on display 504 of client device 502. It is understood that verification offers 503 may be arranged and presented in any suitable manner on display 504, and that verification offers 503 may be selected by one or more suitable input operations including operations other than a select and drag input (e.g., swipe right).

Figure 6:
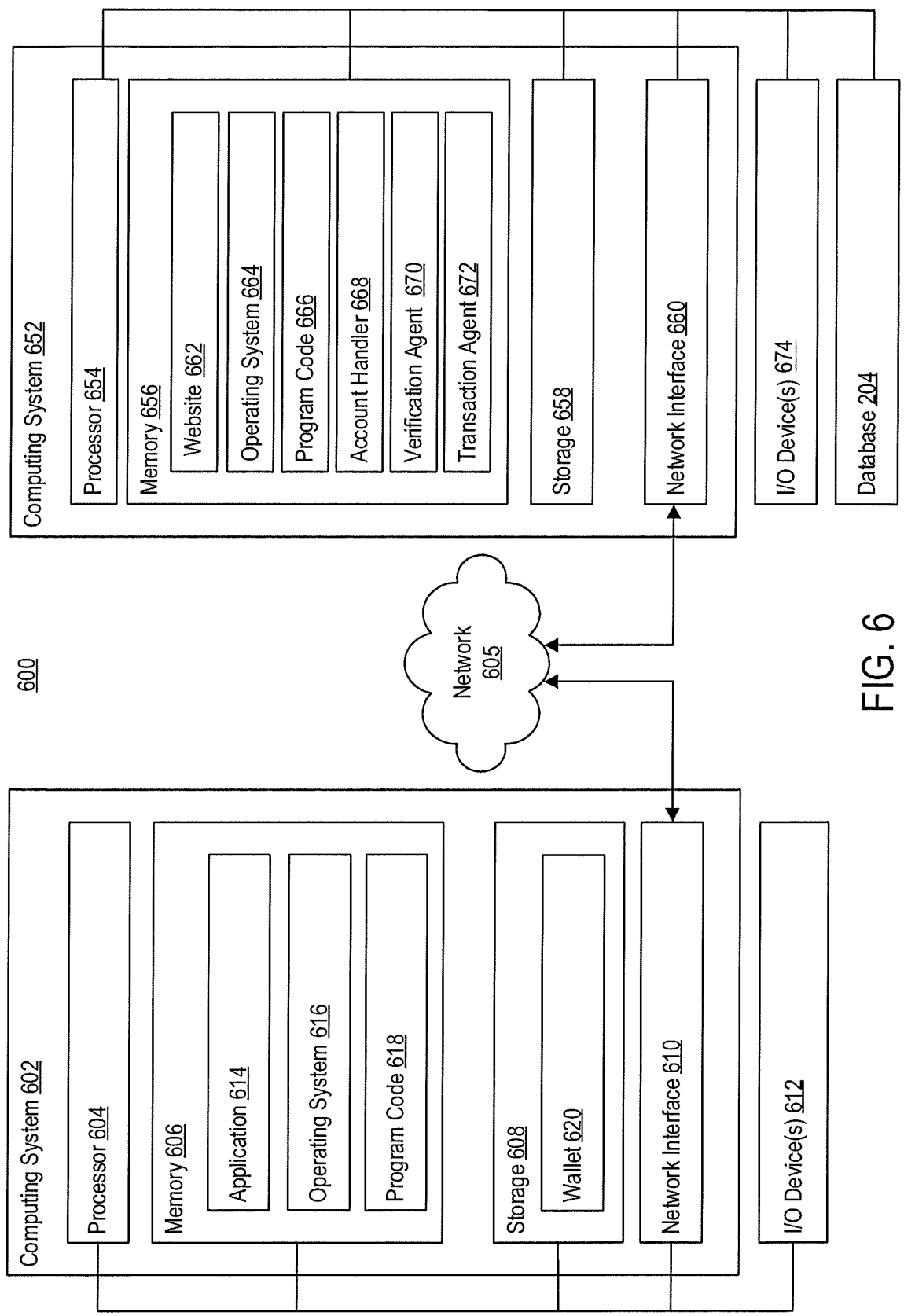
FIG. 6 is a block diagram illustrating a computing environment, according to one or more exemplary embodiments.

FIG. 6 is a block diagram illustrating an exemplary computing environment 600, according to one or more embodiments. Computing environment 600 may include computing system 602 and computing system 652. Computing system 602 may be representative of client device 102. Computing system 652 may be representative of management system 202 or verification network 105.

Computing system 602 may include processor 604, memory 606, storage 608, and network interface 610. In some embodiments, computing system 602 may be coupled to one or more I/O device(s) 612 (e.g., keyboard, mouse, etc.).

Processor 604 may retrieve and execute program code 618 (i.e., programming instructions) stored in memory 606, as well as store and retrieve application data. Processor 604 may be included to be representative of a single processor, multiple processors, a single processor having multiple processing cores, and the like. Network interface 610 may be any type of network communications allowing computing system 602 to communicate externally via computing network 605. For example, network interface 610 may be configured to enable external communication with computing system 652.

Storage 608 may be, for example, a disk storage device. Although shown as a single unit, storage 608 may be a combination of fixed and/or removable storage devices, such as fixed disk drives, removable memory cards, optical storage, network attached storage (NAS), storage area network (SAN), and the like. Storage 608 may include wallet 620. Wallet 620 may be configured to store one or more key pairs associated with a user's blockchain account. Each key pair may include a private key and a corresponding public key.

Memory 606 may include application 614, operating system 616 and program code 618. In some examples, memory 606 may include a geolocation agent (not shown). Program code 618 may be accessed by processor 604 for processing (i.e., executing program instructions). Program code 618 may include, for example, executable instructions for communicating with computing system 652 to display one or more pages of website 662. Application 614 may enable a user of computing system 602 to access a functionality of computing system 652. For example, application 614 may access content managed by computing system 652, such as website 662. The content that is displayed to a user of computing system 602 may be transmitted from computing system 652 to computing system 602, and subsequently processed by application 614 for display through a GUI of computing system 602.

Computing system 652 may include processor 654, memory 656, storage 658, and network interface 660. In some embodiments, computing system 652 may be coupled to one or more I/O device(s) 674. In some embodiments, computing system 652 may be in communication with database 204.

Processor 654 may retrieve and execute program code 666 (i.e., programming instructions) stored in memory 656, as well as store and retrieve application data. Processor 654 is included to be representative of a single processor, multiple processors, a single processor having multiple processing cores, and the like. Network interface 660 may be any type of network communications enabling computing system 652 to communicate externally via computing network 605. For example, network interface 660 may allow computing system 652 to communicate with computer system 602.

Storage 658 may be, for example, a disk storage device. Although shown as a single unit, storage 658 may be a combination of fixed and/or removable storage devices, such as fixed disk drives, removable memory cards, optical storage, network attached storage (NAS), storage area network (SAN), and the like.

Memory 656 may include website 662, operating system 664, program code 666, account handler 668, verification agent 670, and transaction agent 672. Program code 666 may be accessed by processor 654 for processing (i.e., executing program instructions). Program code 666 may include, for example, executable instructions configured to perform steps discussed above in conjunction with FIGS. 3-4. As an example, processor 654 may access program code 666 to perform operations for verifying a cryptocurrency transaction. Website 662 may be accessed by computing system 602. For example, website 662 may include content accessed by computing system 602 via a web browser or application.

Account handler 668 may be configured to manage one or more accounts associated with one or more users. For example, account handler 668 may communicate with database 204 that stores one or more key pairs 215 (FIG. 2). Account handler 668 may generate one or more key pairs upon a user registering with verification network 105. In some embodiments, account handler 668 may generate one or more key pairs stored on computing system 602.

Transaction agent 672 may be configured to manage one or more transactions associated with each account. For example, transaction agent 672 may act as a "middle-man" between computing system 602 and one or more verification institutions 110. In operation, for example, transaction agent 672 may transmit the transaction request to one or more verification institutions 110. Upon receiving input from computing system 602 that corresponds to a selection of a verification offer, transaction agent 672 may transmit the offer acceptance to the respective verification institution 110.

Verification agent 670 may be configured to verify one or more transactions between a payer and a payee. Verification agent 670 may, for example, verify a first signature transmitted from client device 602 to verification network 105 that signals the initiation of the transaction. The first signature may correspond to a first signature needed for a multi-signature transaction. Verification agent 670 may further be configured to verify a second signature transmitted from a verification institution, in response to generation of a verification offer from verification institution 110. The second signature may correspond to a second signature (or additional signature) needed for a multi-signature transaction.

Although not shown in FIG. 6, each verification institution 110 may also include one or more of the components shown in computing system 652. For example, verification institution 110 may include a processor similar to processor 654, memory similar to memory 656, storage similar to storage 658, a network interface similar to network interface 660 and, in some examples, one or more I/O devices similar to I/O device(s) 674. Similar to memory 656 of computing system 652, the memory of verification institution 110 may also include an operating system similar to operating system 664 and program code similar to program code 666. In contrast to memory 656 of computing system 652, the memory of verification institution 110 may store application 262 (FIG. 2) and risk analyzer 264 (FIG. 2), and the program code of verification institution 110 may include program instructions relating to application 260 and risk analyzer 264.

It is understood that aspects of the present disclosure may be implemented in hardware or software or a combination of hardware and software. In one example, aspects of the present disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as compact disk-ROM (CD-ROM) disks readable by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory (RAM)) on which alterable information is stored. Such computer-readable storage media, when carrying computer-readable instructions that direct the functions of the present disclosure, are embodiments of the present disclosure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system for authorizing a blockchain transaction, comprising:
  a verification network in communication with at least a payer computing device, a verification pool that comprises one or more verification computing systems, and a blockchain network, the verification network comprising:
   a computing system having a processor and a memory having programming instructions stored thereon, said programming instructions, when executed by the processor, causing the computing system to:
    receive, from the payer computing device, a transaction request for a blockchain transaction, and
    broadcast a verification request in response to the transaction request to the one or more verification computing systems in the verification pool;

the one or more verification computing systems configured to generate and transmit one or more verification offers to the payer computing device responsive to said verification request;

the payer computing device, in response to receiving the one or more verification offers, configured to transmit a selection of at least one offer from among the one or more verification offers to the verification network, said selection confirming said blockchain transaction; and the verification network, upon receiving said selection, further configured to broadcast the blockchain transaction to the blockchain network, in accordance with the selection of the at least one offer and the transaction request.

2. The system of claim 1, wherein the one or more verification computing systems is further configured to assess the transaction request, determine whether the transaction request satisfies one or more pre-agreed threshold parameters, and perfect the blockchain transaction according to said determination.

3. The system of claim 1, wherein the verification request comprises a partially-signed transaction request, said one or more verification computing systems further configured to generate one or more signatures for inclusion in the one or more verification offers.

4. The system of claim 3, wherein the partially-signed transaction request comprises a first signature generated by a first private key associated with the payer computing device, and wherein the one or more verification computing systems are configured to generate a second signature using a second private key.

5. The system of claim 4, wherein the verification network is configured to determine that the blockchain transaction includes the first signature based on the transaction request and the second signature based on the selection of the at least one offer.

6. The system of claim 1, wherein the blockchain transaction is configured to be reversible via a verification computing system among the one or more verification computing systems associated with the selection of the at least one offer, when the blockchain transaction is determined to be fraudulent.

7. The system of claim 1, wherein the verification network is configured to at least one of confirm that the transaction request includes a first signature, verify the first signature and verify a second signature.

8. The system of claim 1, wherein the transaction request further includes at least one of a public key associated with the payer computing device, payee address information associated with a payee, a public key associated with the payee, a transaction amount and a specification of two or more signatures to perfect the blockchain transaction.

9. The system of claim 1, wherein the verification request includes at least one of a public address associated with the payer computing device, a public address associated with a payee, a transaction amount and an indication of a predetermined number of second signatures to be obtained from the verification pool to complete the blockchain transaction.

10. The system of claim 1, wherein the verification pool is configured to generate the one or more verification offers based on a risk analysis of the blockchain transaction.

11. The system of claim 10, wherein each of the one or more verification offers further includes at least one of an indication of a transaction risk based on the risk analysis, a verification charge based on the risk analysis, and a surge charge based on a volume of verifications requests received by the verification pool.

12. The system of claim 10, wherein the one or more verification computing systems are configured to assess a risk associated with verifying the blockchain transaction based on at least one of a location of the payer computing device, a transaction amount, a frequency of transactions between the payer and a payee, an identity of the payee, a time of the transaction request and a purchase history of the payer.

13. The system of claim 1, wherein, responsive to the broadcast verification request, at least one system among the one or more verification computing systems is configured to at least one of prompt the payer computing device to authenticate with said at least one system, confirm an identity of a payer associated with the payer computing device and verify that an account associated with the payer includes a transaction amount.

14. The system of claim 1, wherein the one or more verification offers represent competing offers having different transaction costs associated with the respective one or more verification computing systems.

15. The system of claim 1, wherein the verification network is configured to at least one of record transaction data associated with the blockchain transaction in a database and notify the verification pool of the selected at least one offer.

16. The system of claim 1, wherein the one or more verification offers transmitted to the payer computing device are configured to be displayed and selectable via a graphical user interface of the payer computing device.

17. A method of authorizing a blockchain transaction, the method comprising:

providing a verification network in communication with at least a payer computing device associated with a payer, a verification pool that comprises one or more verification computing systems, and a blockchain network, the verification network comprising a computing system having a processor and a memory having programming instructions stored thereon, said processor configured to execute the programming instructions;

receiving, by the verification network, from the payer computing device, a transaction request for the blockchain transaction;

broadcasting, by the verification network, a verification request in response to the transaction request to the one or more verification computing systems in the verification pool;

generating and transmitting, by at least one of the one or more verification computing systems, one or more verification offers to the payer computer device responsive to said verification request;

confirming, by the payer computing device, the blockchain transaction by selecting at least one offer from among the one or more verification offers;

receiving, by the verification network, from the payer computing device, a selection of the at least one offer; and broadcasting, by the verification network, the blockchain transaction to the blockchain network, in accordance with the selection of the at least one offer and the transaction request.

18. The method of claim 17, further comprising:

assessing, by the one or more verification computing systems, the transaction request;

determining, by the one or more verification computing systems, whether the transaction request satisfies one or more pre-agreed threshold parameters; and perfecting, by the one or more verification computing systems, the blockchain transaction according to said determining.

19. The method of claim 17, wherein the verification request comprises a partially-signed transaction request, the method further comprising:
generating, by said one or more verification computing systems, one or more signatures for inclusion in the one or more verification offers.

20. The method of claim 19, wherein the partially-signed transaction request comprises a first signature generated by a first private key associated with the payer computing device, the method further comprising:
generating, by the one or more verification computing systems, a second signature using a second private key.

21. The method of claim 20, further comprising:
determining, by the verification network, that the blockchain transaction includes the first signature based on the transaction request and the second signature based on the selection of the at least one offer.

22. The method of claim 17, wherein the blockchain transaction is configured to be reversible via a verification computing system among the one or more verification computing systems associated with the selection of the at least one offer, when the blockchain transaction is determined to be fraudulent.

23. The method of claim 17, wherein the method further comprises at least one of:
confirming, by the verification network, that the transaction request includes a first signature;
verifying, by the verification network, the first signature; and
verifying, by the verification network, a second signature.

24. The method of claim 17, wherein the transaction request further includes at least one of a public key associated with the payer computing device, payee address information associated with a payee, a public key associated with the payee, a transaction amount and a specification of two or more signatures to perfect the blockchain transaction.

25. The method of claim 17, wherein the verification request includes at least one of a public address associated with the payer computing device, a public address associated with a payee, a transaction amount and an indication of a predetermined number of second signatures to be obtained from the verification pool to complete the blockchain transaction.

26. The method of claim 17, further comprising:
generating, by the verification pool, the one or more verification offers based on a risk analysis of the blockchain transaction.

27. The method of claim 26, wherein each of the one or more verification offers further includes at least one of an indication of a transaction risk based on the risk analysis, a verification charge based on the risk analysis, and a surge charge based on a volume of verifications requests received by the verification pool.

28. The method of claim 26, further comprising:
assessing, by the one or more verification computing systems, a risk associated with verifying the blockchain transaction based on at least one of a location of the payer computing device, a transaction amount, a frequency of transactions between the payer and a payee, an identity of the payee, a time of the transaction request and a purchase history of the payer.

29. The method of claim 17, wherein, responsive to the broadcast verification request, the method further comprises at least of:
prompting, by at least one system among the one or more verification computing systems, the payer computing device to authenticate with said at least one system;
confirming, by the at least one system, an identity of a payer associated with the payer computing device; and
verifying, by the at least one system, that an account associated with the payer includes a transaction amount.

30. The method of claim 17, further comprising:
displaying, via a graphical user interface of the payer computing system, the one or more verification offers such that said one or more verification offers are selectable via said graphical user interface.

* * * * *